United States Patent
Bhowmik et al.

(10) Patent No.: US 9,693,576 B2
(45) Date of Patent: Jul. 4, 2017

(54) FERMENTED INGREDIENT

(71) Applicant: Givaudan SA, Vernier (CH)

(72) Inventors: Tarun Bhowmik, Mason, OH (US); Christopher Todd Simons, Wyoming, OH (US); Stefka Ivanova Myaka, Loveland, OH (US)

(73) Assignee: GIVAUDAN SA, Vernier (CH)

( * ) Notice: Subject to any disclaimer, the term of this patent is extended or adjusted under 35 U.S.C. 154(b) by 0 days.

(21) Appl. No.: 13/932,821

(22) Filed: Jul. 1, 2013

(65) Prior Publication Data

US 2013/0287893 A1    Oct. 31, 2013

Related U.S. Application Data

(63) Continuation of application No. 12/594,391, filed as application No. PCT/CH2008/000148 on Apr. 3, 2008, now abandoned.

(60) Provisional application No. 60/910,286, filed on Apr. 5, 2007.

(51) Int. Cl.
| | | |
|---|---|---|
| A23L 1/22 | (2006.01) | |
| A23J 3/34 | (2006.01) | |
| A23L 19/18 | (2016.01) | |
| A23L 27/00 | (2016.01) | |
| A23L 27/22 | (2016.01) | |
| A23L 27/24 | (2016.01) | |
| A23L 27/40 | (2016.01) | |
| A23L 23/00 | (2016.01) | |

(52) U.S. Cl.
CPC ........... *A23L 1/22091* (2013.01); *A23J 3/346* (2013.01); *A23L 19/18* (2016.08); *A23L 23/00* (2016.08); *A23L 27/22* (2016.08); *A23L 27/24* (2016.08); *A23L 27/40* (2016.08); *A23L 27/45* (2016.08); *A23L 27/88* (2016.08); *A23Y 2220/00* (2013.01); *A23Y 2220/67* (2013.01)

(58) Field of Classification Search
CPC .............................. A23L 1/22091; A23J 3/346
USPC ...................................................... 426/46, 533
See application file for complete search history.

(56) References Cited

U.S. PATENT DOCUMENTS

| 5,145,707 A | 9/1992 | Lee |
| 7,566,690 B2 | 7/2009 | Wu et al. |
| 2005/0260300 A1 | 11/2005 | Tada et al. |

FOREIGN PATENT DOCUMENTS

| EP | 0824873 A | 2/1998 |
| EP | 1163853 A | 12/2001 |
| EP | 1163854 A | 12/2001 |
| WO | 2005013706 A | 2/2005 |
| WO | 2005096847 A | 10/2005 |

OTHER PUBLICATIONS

Reichert, R. A. 1982. J. Agric. Food Chem. 30: 312-317.*

* cited by examiner

*Primary Examiner* — Hamid R Badr
(74) *Attorney, Agent, or Firm* — Norris McLaughlin & Marcus PA

(57) ABSTRACT

Provided is a hydrolyzed pea protein based fermentation process employing *Lactobacillus* sp., the formed ingredient, food products comprising said ingredient and a method of enhancing the salty taste of food products.

18 Claims, No Drawings

FERMENTED INGREDIENT

This application is a continuation of U.S. application Ser. No. 12/594,391 filed Oct. 16, 2009, which is a 371 application of PCT/CH2008/000148 filed Apr. 3, 2008, which is a non provisional of application 60/910,286 filed Apr. 5, 2007.

This is a Provisional application for patent pursuant to 35 U.S.C. §111(b).

TECHNICAL FIELD

Disclosed is a novel ingredient and the fermentation process to form said ingredient which enhances saltiness in food products, in particular in food products with a low or reduced sodium content, to improve their taste.

BACKGROUND

A high amount of sodium intake is considered to be detrimental to health and therefore there is the desire to reduce the amount of sodium chloride (NaCl) in food products, without reducing the desired salty taste at the same time. The salty taste is very important to the perceived flavour intensity and profile, especially for savory food products.

There exists a need in the food industry to provide ingredients that enhance the salty taste of food products so that NaCl can be reduced. Further, there is a need to provide ingredients that enhance the umami taste of food products, especially savoury food products.

Potassium Chloride (KCl) is used to replace other salts, particularly NaCl. If KCl is used at the desired concentrations to reduce the NaCl concentration, an undesirable bitter and metallic taste is perceived by the consumer. It would therefore be of interest to find a product that is able to enhance the salty taste of NaCl so KCl can be partly or completely replaced.

Surprisingly, it has now been found that by the process based on fermentation of hydrolyzed pea protein described herein below, an ingredient can be formed that has an enhancing effect on the perception of salty taste in food products.

Fermented products based on protein rich botanical materials which are hydrolyzed are known to have an umami taste. In particular, protein from soy and wheat gluten is used to form ingredients having an umami taste. To form such ingredients, materials with a high content of glutamic acid are chosen, which is a very important factor for umami taste. Wheat gluten has a glutamic acid content of 34%, soy protein has a glutamic acid content of 20%. To reach a similar effect, one would choose a material of similar or higher glutamic acid content. None of these ingredients is known to have a salt enhancing effect.

SUMMARY

Provided is a process of forming a salt enhancing ingredient, wherein
a) pea protein is hydrolyzed, and
b) the hydrolyzed or partly hydrolyzed pea protein is subjected to fermentation with a *Lactobacillus* species at a temperature suitable for the species at a starting pH of at least 6 or higher and incubated until a pH of 5.5 or lower is reached.

Provided is a process as herein described wherein the hydrolysis in step a) is an enzymatic hydrolysis performed with an enzyme or enzyme preparation having both proteinase and peptidase activity at a temperature suitable for the enzyme.

Provided is a process as herein described wherein the enzyme preparation is from *Aspergillus oryzae* (Umamizyme™) and the hydrolysis is performed at 40° C. to 60° C.

Provided is a process as herein described wherein the hydrolysis is performed chemically by adding a sufficient amount of acid.

Provided is a process as herein described wherein the acid is selected from the group consisting of hydrochloric acid, lactic acid, phosphoric acid, and citric acid.

Provided is a process as herein described wherein the hydrolysis temperature is from 50° C. to 70° C.

Provided is a process as herein described wherein the hydrolysis is performed by a combination of an acid and an enzyme or enzyme preparation having both proteinase and peptidase activity at a temperature suitable for the enzyme or enzyme preparation.

Provided is a process as herein described wherein the *Lactobacillus* species is selected from one or more of *L. plantarum*, *L. casei*, *L. brevis* and *L. helveticus*.

Provided is a a salt enhancing ingredient formed by a process as herein described.

Provided is the a salt enhancing ingredient as herein described which is concentrated at least 1.5 times by removing water.

Provided is the a salt enhancing ingredient as herein described wherein the a salt enhancing ingredient is spray-dried.

Provided is a flavor composition for food products comprising the a salt enhancing ingredient as herein described.

Provided is the flavor composition as herein described wherein the concentration of the a salt enhancing ingredient as herein described is 0.02% to 0.3% (wt/wt) based on a spray-dried 2× concentrate.

Provided is a food product comprising the a salt enhancing ingredient as herein described.

Provided is the food product as herein described wherein the concentration of the a salt enhancing ingredient as herein described is 0.002% to 0.03% (wt/wt) based on a spray-dried 2× concentrate.

Provided is the food product as herein described which is a reduced or low sodium food product.

Provided is the food product as herein described wherein the sodium chloride concentration is 0.15% (wt/wt) to 3% (wt/wt).

Provided is the food product as herein described wherein the sodium chloride concentration is 0.15% (wt/wt) to 1.5% (wt/wt).

Provided is the reduced or low sodium food product as herein described additionally comprising KCl, for example in a concentration of 0.1% to 2% KCl.

Provided is a method of providing a food product enhanced in saltiness wherein the a salt enhancing ingredient as herein described is admixed to a food product.

Provided is the method as herein described wherein the food product is a reduced or low sodium food product optionally containing KCl, optionally in a concentration of 0.1% to 2% KCl.

DETAILED DESCRIPTION

The term pea or peas as used herein refers to the round seeds of the leguminous plant *Pisum sativum* and its cultivars, having long green pods containing the edible seeds. Several other seeds of the family Fabaceae, most of them round, are also called peas, these however are explicitly excluded. Alternatively, instead of pea seeds, pea sprouts may be used.

The pea protein for use in methods provided herein can be in any suitable form, for example in form of pea seeds or sprouts (including whole or ground up seeds and whole or cut sprouts), or as a protein isolate from peas, or any natural material containing protein from pea and optionally additional ingredients. Pea protein has a comparatively low glutamic acid content of only about 13%.

The pea protein is first hydrolyzed or partly hydrolyzed and then fermented with *Lactobacillus plantarum*; the process can be performed consecutively in one hydrolysation/fermentation vessel. If the hydrolysis is performed enzymatically, hydrolysis and fermentation can be performed in parallel. If acid hydrolysis is used, *Lactobacillus* should be added after neutralisation of the acid to about pH 6 to 7, depending on the particular strain used. If the pH is below 6, *Lactobacillus plantarum* will grow very slowly and usually not sufficiently.

The hydrolysation of pea protein can be performed enzymatically or by adding a sufficient amount of acid, or by a combination of enzyme(s) (proteinase and peptidase activity) and acid. For example, if hydrochloric acid is used, it is used in an end concentration in the hydrolysation mixture of 5.5M. Other acids can be used in an amount to give a similar pH as 5.5M hydrochloric acid does accordingly.

For enzymatic hydrolysation, an enzyme or enzyme preparation containing more than one enzyme and having both proteinase and peptidase activity is used at a suitable temperature for the one or more enzyme. A suitable temperature will be chosen according to the temperature requirements of the enzymes, for example, Umamizyme™ will tolerate temperatures from about 40° C. to about 60° C., with an optimum at around 55° C. A useful enzyme is a protease enzyme preparation, for example Umamizyme™ (Amano, Elgin, Ill.). Protease preparations contain two types of enzymes; proteinases, which hydrolyze proteins to form small peptides, and peptidases, which release amino acids from the terminal ends of proteins and peptides. Umamizyme™ originates from *Aspergillus oryzae* and is rich in Endo & Exo activity.

All enzymes used should be food-grade. The amount or units of the enzymes needed are chosen to ensure sufficient activity and avoid developing bitter notes. The amount of enzyme depends on the amount of protein and there should be a ratio of 0.5:20 to 3:20 of enzyme:protein (0.5 to 3 parts enzyme for 20 parts of pea protein), for example 1:20 of enzyme:protein (Umamizyme™ has 70 U/g at pH 7).

In the acid hydrolysation, acids may be used including, for example, one or more of hydrochloric acid, lactic acid, phosphoric acid, and citric acid. The hydrolysation is performed at a suitable temperature, for example from about 50° C. to about 70° C.

Another alternative is a combination of acid hydrolysis and enzymatic hydrolysis. In this case, acid, enzyme, pH and temperature need to be chosen so that they are compatible. The relevant data is known and readily available for a large number of proteinase and peptidase enzymes.

The acid hydrolysis is a possibility but has a disadvantage as a small amount of salt is added when neutralising the acid. The resulting salt enhancer will still be useful for salt reduced products but the reduction potential may be slightly limited. More importantly, the contaminant 3-chloropropane-1,2-diol (3-MCPD) and other mono- and di-chloropropanol contaminants may be formed, which has been in discussion for potential adverse health effect, so consumers tend to avoid products containing or potentially containing 3-MCPD.

The seed culture/overnight culture for the following fermentation may be prepared by methods well-known in the art. It may be grown overnight, for example 12 hours, at the appropriate temperature for the microorganism. 37° C. is a suitable temperature for *L. plantarum*. Any suitable medium may be selected, for example MRS broth (Difco, United States of America).

The fermentation with *Lactobacillus* is started using the hydrolyzed protein as fermentation broth and adding a sufficient volume of an overnight seed culture at a pH of at least 6 or higher, for example a pH of 6 to 7. Fermentation is allowed to proceed until the pH has lowered to at least pH 5.5 or lower, for example pH 5.5 to pH 4.5, which usually takes about 5 to 12 hours. The fermentation temperature is chosen to accommodate the microorganism. Useful temperature ranges for Lactobacilli and in particular *L. plantarum* include, for example, from 20° C. to 40° C., from 30° C. to 40° C., from 35 to 40° C., with an optimum around 36° C. to 38° C. At a low temperature the growth rate will be low, at a high temperature the microorganism will be killed.

*Lactobacillus plantarum* is used for fermentation, however, other *Lactobacillus* species may also be useful, for example, *L. casei, L. brevis* and *L. helveticus* may also be useful.

After fermentation (once a low pH is reached) the fermentation broth is pasteurized at 90° C. for 30 minutes to inactivate microorganisms and enzymes.

Afterwards, the pasteurized fermentation broth may be filtered to remove any larger particles and may be concentrated, for example by evaporation, including boiling at for example up to 100° C.

The salt enhancer may be used as such or in concentrated form. Alternatively, the concentrated salt enhancer may be used as a paste or powder or spray-dried by methods well known in the art. For the spray-dried salt enhancer, well known carriers and anti-caking agents may be added.

The final form of the salt enhancer may be chosen according to methods well known in the art and will depend on the particular food application. For liquid foods, for example soups, the salt enhancer can be used without further processing in its liquid form. For dry applications such as crackers, the spray-dried concentrated salt enhancer can be used.

The salt enhancer may be directly added to food products, or be provided as part of a flavour composition for flavouring food products.

By enhancing is meant the effect of an ingredient on a particular flavour note in food which is found more pronounced (stronger, enhanced) in its taste intensity as analysed by trained panellists sensitive to that note, when comparing food comprising an ingredient with enhancing effect to the food without added enhancing ingredient.

The term food product is used in a broad meaning to include any product taken into the mouth including food, beverages, nutraceuticals and dental care products including mouth wash.

Food products include cereal products, rice products, pasta products, ravioli, tapioca products, sago products, baker's products, biscuit products, pastry products, bread products, confectionery products, dessert products, gums, chewing gums, chocolates, ices, honey products, treacle products, yeast products, salt and spice products, savory products, mustard products, vinegar products, sauces (condiments), processed foods, cooked fruits and vegetable products, meat and meat products, meat analogues/substitutes, jellies, jams, fruit sauces, egg products, milk and dairy products, cheese products, butter and butter substitute products, milk substitute products, soy products, edible oils and fat products, medicaments, beverages, juices, fruit juices, vegetable juices, food extracts, plant extracts, meat extracts, condiments, nutraceuticals, gelatins, tablets, lozenges, drops, emulsions, elixirs, syrups, and combinations thereof.

Of particular interest are food products traditionally high in sodium salt with a reduced sodium salt concentration, including condiments and sauces (cold, warm, instant, preserved, sate, tomato, BBQ Sauce, Ketchup, mayonnaise and analogues, bechamel), gravy, chutney, salad dressings (shelf stable, refrigerated), batter mixes, vinegar, pizza, pasta, instant noodles, french fries, croutons, salty snacks (potato chips, crisps, nuts, tortilla-tostada, pretzels, cheese snacks, corn snacks, potato-snacks, ready-to-eat popcorn, microwaveable popcorn, caramel corn, pork rinds, nuts), crackers (Saltines, 'Ritz' type), "sandwich-type" cracker snacks, breakfast cereals, cheeses and cheese products including cheese analogues (reduced sodium cheese, pasteurized processed cheese (food, snacks & spreads), savoury spreads, cold pack cheese products, cheese sauce products), meats, aspic, cured meats (ham, bacon), luncheon/breakfast meats (hotdogs, cold cuts, sausage), soya-based products, tomato products, potato products, dry spice or seasoning compositions, liquid spice or seasoning compositions including pesto, marinades, and soup-type/meal-alternative beverages, and vegetable juices including tomato juice, carrot juice, mixed vegetable juices and other vegetable juices.

Preferred processed foods include margarine, peanut butter, soup (clear, canned, cream, instant, UHT), gravy, canned juices, canned vegetable juice, canned tomato juice, canned fruit juice, canned juice drinks, canned vegetables, pasta sauces, frozen entrees, frozen dinners, frozen hand-held entrees, dry packaged dinners (macaroni & cheese, dry dinners-add meat, dry salad/side dish mixes, dry dinners-with meat). Soups may be in different forms including condensed wet, ready-to-serve, ramen, dry, and bouillon, processed and pre-prepared low-sodium foods.

Depending on the food product, for food products that contain about 10 to 100%, for example 25 to 50%, less sodium than a comparable food product (for example "reduced sodium" products with 25% reduction, or "light in sodium" products with a 50% reduction), the salt enhancer may be employed as follows: a useful concentration for most food applications is 25 to 300 ppm or 0.002% to 0.03% (wt/wt) based on a spray-dried 2× concentrate (compare example 1 herein below). The salt enhancer may be used in unconcentrated or concentrated form or the concentrate may be formulated into a paste or powder by methods known in the art. In this case the amount to be used has to be adjusted accordingly. Flavour compositions such as spices are often more concentrated, for example a 10× concentrate, and the concentration will be adjusted higher accordingly (250 ppm to 3000 ppm).

The NaCl content in common food products with a regular NaCl concentration varies with most products ranging from 0.5% to 5% NaCl. Seasoning or products used as seasoning, such as croutons, sauces or salad dressings that are employed in a small amount (to be applied to e.g. salad or noodles), have a concentration of for example from 2% to 5% NaCl. Soups usually contain 0.6% to 1.25% NaCl. Salty crackers and meat products (salami, ham, bacon) usually contain 2% to 4% NaCl. Cereals usually contain 0.6 to 3% NaCl. Products that need to be reconstituted (dry soups) usually range in the concentration ranges indicated after reconstitution.

For low sodium products containing even less NaCl than products with reduced sodium content (353 mg per serving), the amount of the salt enhancer may have to be increased.

For food products with added KCl depending on the food product and said ingredients, the concentration of KCl may be from about 0.1% or 0.2% up to 1%, up to 1.5%, up to 2%, or higher, depending on how much the sodium concentration is reduced. A KCl concentration of 0.25% to 1.5%, for example 0.5% to 1.5% KCl will be useful for most low sodium products. A range to which the NaCl concentration may usefully be reduced for most applications is, for example, 0.25% to 2.5%, or from 0.125% to 1.25%. The amount of the salt enhancer to be added to the food product as an ingredient will depend on the concentration of KCl used, and the specific food product including the particular base and flavour. Generally, if a spray-dried 2× concentrate of the salt enhancer is used, 0.002% to 0.03% of said concentrate in a product (based on product weight) may be used. The salt enhancer may be used in un-concentrated form or the concentrate may be formulated into a paste or powder or spray-dried salt enhancer by methods known in the art. In this case, the amount to be used has to be adjusted accordingly.

The appropriate concentration of the salt enhancer can be easily tested by an organoleptic titration. This technique is well known in the field sensory analysis.

EXAMPLES

Unless otherwise indicated, percentages are given as wt/wt.

Example 1

Production of the Pea Base Note by Fermentation with *Lactobacillus plantarum*

Seed/Overnight Culture Medium:

| | |
|---|---|
| Soy peptone (DMV International, Chicago, IL, USA) | 10 g |
| Yeast extract (Sensient Flavors, Indianapolis, IN, USA) | 5 g |
| Dextrose (Corn Products, Bedford Park, IL, USA) | 20 g |
| Polysorbate 80 (Tween 80, Lonza, Fair Lawn, NJ, USA) | 1 g |
| Sodium Acetate (Niacet, Niagra Falls, NY, USA) | 5 g |
| Magnesium Sulfate (Sigma, St. Louis, MO, USA) | 0.1 g |
| Manganese Sulfate (Sigma, St. Louis, MO, USA) | 0.05 g |
| Dipotassium Phosphate (Niacet, Niagra Falls, NY, USA) | 2 g |

Hydrolysate Mixture:

| | |
|---|---|
| Pea protein isolate (Propulse ®, Norben company, Willoughby, Ohio, USA) | 183 g |
| Sodium chloride | 1 g |
| Umamizyme ™ (Amann, Japan) | 6 g |
| *Lactobacillus plantarum* culture, strain LP14917 | 3 g |
| Water | add 1000 g |

A seed culture is prepared by incubating *L. plantarum*, ATCC 14917 for 12 hours, 37° C. in the seed culture medium as indicated above.

A fermentation broth is formed as follows:

Water, salt, and pea protein isolate are mixed well in a fermentation vessel, the initial pH is noted (usually about 6.3), and the mixture is subjected to agitation at ~150 rpm, heated, and subjected to 121° C. for 60 minutes. The sterilised mixture is cooled to 55° C., and Umamizyme™ is added (6 g Umamizyme™ dissolved in a small amount of the water and filter-sterilized using a 0.45 microns filter). The mixture with Umamizyme™ is left to hydrolyse for 24 hours at 55° C. and 150 rpm.

The resulting hydrolysate is left to cool to 37° C., and is incubated at 37° C. for 15 to 30 minutes. The pH is determined (typically about 5.6 to 5.7) to detect a potential contamination (if contamination occurred, the whole procedure will have to be repeated using fresh materials).

The hydrolysate is inoculated with 3 ml of a *L. plantarum* culture (inoculum of an overnight seed culture with a cell density of about $10^6$ cells/g) and incubated at 37° C. and 60 rpm for 6 to 8 hours until the pH (originally around pH 6) has reached about 5 (typically from pH 4.5 to pH 5.5).

The culture is then pasteurized and thereby inactivated at 90° C. for 30 minutes and cooled to 30° C.

The resulting inactivated culture is filtered by passing through a felt filter bag in a filter centrifuge. The filtered culture (supernatant containing the remaining smaller solids, minus biomass including larger undigested proteins) is concentrated 2× by evaporation/boiling at 100° C. The resulting 2× concentrate's solid content is determined using a moisture analyser and is spray-dried onto a potato maltodextrin carrier in a ratio of 1:1 solids of the 2× concentrate to carrier.

Finally, 0.5% (wt/wt) tricalciumphosphate (TPC) based on total weight of the 2× concentrate on the carrier is added as an anti-caking agent.

The resulting spray-dried salt enhancer with anti-caking agent is referred to as "pea base note" or "PBN" in the following examples.

Example 2

Sensory Evaluation

Taste of PBN

A sample of PBN of example 1 in a concentration of 0.2% in water is evaluated by 6 trained panelists for its umami and salty taste.

Panelists evaluate the taste of PBN in comparison to references of 0.25% NaCl (salty) and 0.15% monosodium-glutamate (MSG, umami taste).

Panelists determined that the PBN sample on its own has an umami but no salty taste.

Example 3

Sensory Evaluation

Enhancement of Saltiness in Low Sodium Chicken Broth

The salt enhancing effect of the pea base note (PBN, produced as described in example 1) was determined by comparing salt reduced chicken broth with and without PBN.

The following samples were compared in a forced choice method:

Low Sodium Chicken Broth (50% reduction-960 mg sodium per 240 g broth)

PBN of example 1 in a concentration of 0.1% (wt/wt) in the identical low sodium chicken broth 15 ml of each sample at a temperature of 60° C. was presented in 2 oz plastic cups and in random order to 15 panelists.

In two replications (over 1 session), panelists were asked to compare the two samples and chose the sample having the more salty taste. Distilled warm water for rinsing the palate was provided for use between samples. The data was subjected to an R-index analysis, the results are indicated in the table below.

| R-index | Significantly different (p < 0.05) | Saltiness of PBN sample |
|---|---|---|
| 72% | Yes | Increased |

An R-index of 50% is equivalent to pure chance and means that two samples are not detectably different. The PBN sample had a calculated R-index of 71%, which is above 50%, meaning that it was significantly more salty compared to the chicken broth sample. Accordingly, it can be concluded that PBN significantly enhanced the salty taste intensity of chicken broth.

As a control, PBN was produced as described in example 1 except that the sodium chloride that had been used to optimise protein solubility and enzyme activity, which already was at a low concentration of 0.1%, was completely left out. The results with this control showed a similar enhancement effect in the forced choice method.

Example 4

Sensory Evaluation

Enhancement of Saltiness in Low Sodium Chicken Broth with KCl

The evaluation was performed as described in example 3, except that the following two samples were compared:

Low Sodium Chicken Broth (50% reduction-960 mg sodium per 240 g broth) with 0.30% (wt/wt) KCl PBN of example 1 in a concentration of 120 ppm in the identical low sodium chicken broth The results are indicated in the table below.

| R-index | Significantly different (p < 0.05) | Saltiness of PBN sample |
|---|---|---|
| 72% | Yes | Increased |

The PBN sample had a calculated R-index of 71%, which is above 50%, meaning that it was significantly more salty compared to the low sodium chicken broth sample with KCl. Accordingly, it can be concluded that PBN significantly enhanced the perceived intensity of a low sodium chicken broth containing KCl.

As a control, PBN was produced as described in example 1 except that the sodium chloride that had been used to optimise protein solubility and enzyme activity, which already was at a low concentration of 0.1%, was completely left out. The results with this control showed a similar enhancement effect in the forced choice method.

Example 5

Sensory Evaluation

Umami Taste in Bouillon

The intensity of umami taste of a pea base note sample (PBN, produced as described in example 1) in a concentration as given in the table below in bouillon was determined by comparing it to various bouillon samples (Plain Chicken Bouillon) containing autolyzed yeast extract, hydrolyzed vegetable protein or cultured wheat gluten.

17 trained panelists rated the intensity of the umami taste on a 0-100 point anchored scale (0=no umami sensation, 10-25=low, 25-40=low-medium, 40-60=medium, 60-80=medium/high, 80-100=high umami intensity) over 3 separate replications. The mean umami intensity score for plain bouillon was used to further anchor the umami intensity.

1.5 ounce samples were presented to panelists monadicaly at 60° C. in 2 oz plastic cups. Distilled warm water for rinsing the palate between samples was provided to panelists.

The ratings were averaged across replications and panelists and subjected to an analysis of variance. Variance is indicated as a, b, c with the same letters indicating that the probes were not significantly different.

| Samples | concentration in boullion [% (wt/wt)] | glutamic acid concentration [g/100 g sample] | Umami Intensity ratings (0-100 scale) |
| --- | --- | --- | --- |
| autolyzed yeast extract | 0.30 | 0.048 | 28.2 a |
| hydrolyzed vegetableprotein | 0.30 | 0.06 | 24.2 abc |
| cultured wheat gluten | 0.30 | 0.09 | 23.3 bc |
| PBN | 0.30 | 0.008 | 26.1 abc |
| PBN | 0.20 | 0.0054 | 23.9 bc |
| PBN | 0.10 | 0.0027 | 21.9 c |

The results show that PBN has a similarly high or better umami intensity as autolyzed yeast extract, hydrolyzed vegetable protein and cultured wheat gluten even when used in a concentration having a much lower glutamic acid content.

Example 6

Sensory Evaluation

Umami Intensity in Potato Chips

The intensity of umami taste of a pea base note sample (PBN, produced as described in example 1) 0.5% in potato chips was determined by comparing it to potato chips samples seasoned with autolyzed yeast extract, hydrolyzed vegetable protein or cultured wheat gluten.

11 trained panelists rated the intensity of the umami taste on a 0-100 point anchored scale (0=no umami sensation, 10-25=low, 25-40=low-medium, 40-60=medium, 60-80=medium/high, 80-100=high umami intensity) over 2 separate replications. The mean umami intensity score for unseasoned potato chips was used to further anchor the umami intensity.

7 g of each sample (smashed chips to ensure a uniform distribution of added ingredient) were presented to panelists monadicaly in 2 oz plastic cups. Rose hip tea and water was provided for rinsing the palate between samples was provided to panelists.

The ratings were averaged across replications and panelists and subjected to an analysis of variance. Variance is indicated as a, b, c with the same letters indicating that the probes were not significantly different.

| Potato Chip Samples | concentration on potato chips [% (wt/wt)] | glutamic acid concentration [g/100 g sample] | Umami Intensity ratings (0-100 scale) |
| --- | --- | --- | --- |
| autolyzed yeast extract | 1.5% | 0.24 | 31.6 a |
| hydrolyzed vegetable protein | 1.5% | 0.3 | 29.7 a |
| cultured wheat gluten | 1.5% | 0.45 | 30.1 a |
| PBN | 0.5% | 0.013 | 28.9 a |

The results show that PBN has a similarly high umami intensity as autolyzed yeast extract, hydrolyzed vegetable protein and cultured wheat gluten even when used in a concentration having a much lower glutamic acid content.

The invention claimed is:

1. A process of producing a salt enhancing ingredient having an umami taste, comprising steps wherein
   a) a low glutamic acid content pea protein of the leguminous plant *Pisum sativum* is hydrolyzed or partly hydrolyzed, and
   b) the hydrolyzed or partly hydrolyzed pea protein is subjected to fermentation with *Lactobacillus plantarum* at a temperature suitable for the species at a starting pH of at least 6 or higher and incubated until a pH of 5.5 or lower is reached, wherein hydrolysis is step a) is enzymatic hydrolysis performed with an enzyme or enzyme preparation having both proteinase and peptidase activity at a temperature suitable for the enzyme.

2. A process according to claim 1 wherein the hydroylysis of the pea protein occurs is an enzymatic hydrolysis utilizing an enzyme preparation from *Aspergillus oryzae* and wherein the hydrolysis occurs at a temperature from 40° C. to 60 C.

3. A process according to claim 1 wherein the hydrolysis temperature is from 50° C. to 70° C.

4. A process according to claim 1 wherein in addition to the enzymatic hydrolysis, acid hydrolysis also occurs.

5. The salt enhancing ingredient formed by the process of claim 1.

6. The salt enhancing ingredient of claim 5 which is concentrated at least 1.5 times by removing water.

7. The salt enhancing ingredient of claim 5 wherein the salt enhancing ingredient is spray-dried.

8. A flavor composition for food products comprising the salt enhancing ingredient of claim 5.

9. The flavor composition of claim 8 wherein the concentration of the salt enhancing ingredient of claim 5 is 0.02% to 0.3% (wt/wt) based on a spray-dried 2× concentrate.

10. A food product comprising the salt enhancing ingredient of claim 5.

11. The food product of claim 10 wherein the concentration of the salt enhancing ingredient is 0.002% to 0.03% (wt/wt) based on a spray-dried 2× concentrate.

12. The food product of claim 10 which is a reduced or low sodium food product.

13. The food product of claim 12 wherein the sodium chloride concentration is 0.15% (wt/wt) to 3% (wt/wt).

14. The food product of claim 12 wherein the sodium chloride concentration is 0.15% (wt/wt) to 1.5% (wt/wt).

15. The reduced or low sodium food product according to claim 12 additionally comprising KCl in a concentration of 0.1% to 2% KCl.

16. A method of providing a food product enhanced in saltiness wherein the salt enhancing ingredient as defined in claim 5 is admixed to a food product.

17. The method of claim 16 wherein the food product is a reduced or low sodium food product optionally containing KCl in a concentration of 0.1% to 2% KCl.

18. A process according to claim 1, wherein the pea protein of the leguminous plant *pisum Pisum sativum* has a glutamic acid content of about 13%.

* * * * *